US010315526B2

(12) United States Patent
van Boheemen et al.

(10) Patent No.: US 10,315,526 B2
(45) Date of Patent: Jun. 11, 2019

(54) SWITCHED-CAPACITOR POWER RAMPING FOR SOFT SWITCHING

(71) Applicant: WiTricity Corporation, Watertown, MA (US)

(72) Inventors: Edward van Boheemen, Munich (DE); Felix Weidner, Munich (DE)

(73) Assignee: WiTricity Corporation, Watertown, MA (US)

( * ) Notice: Subject to any disclaimer, the term of this patent is extended or adjusted under 35 U.S.C. 154(b) by 32 days.

(21) Appl. No.: 15/415,774

(22) Filed: Jan. 25, 2017

(65) Prior Publication Data

US 2018/0212463 A1 Jul. 26, 2018

(51) Int. Cl.
| | |
|---|---|
| *H02J 7/00* | (2006.01) |
| *B60L 11/18* | (2006.01) |
| *H02J 50/12* | (2016.01) |
| *H02M 7/48* | (2007.01) |
| *H02J 50/80* | (2016.01) |
| *B60L 53/12* | (2019.01) |
| *H02M 1/00* | (2006.01) |
| *H02J 7/02* | (2016.01) |

(52) U.S. Cl.
CPC ............ *B60L 11/182* (2013.01); *B60L 53/12* (2019.02); *H02J 50/12* (2016.02); *H02J 50/80* (2016.02); *H02M 7/48* (2013.01); *H02J 7/025* (2013.01); *H02M 2001/0058* (2013.01); *H02M 2007/4818* (2013.01); *Y02B 70/1441* (2013.01); *Y02B 70/1491* (2013.01); *Y02T 10/7005* (2013.01); *Y02T 10/7022* (2013.01); *Y02T 10/7241* (2013.01)

(58) Field of Classification Search
USPC .................. 320/107, 108, 109, 110, 104
See application file for complete search history.

(56) References Cited

U.S. PATENT DOCUMENTS

| 8,643,326 B2* | 2/2014 | Campanella ............. H01Q 7/00 |
| | | 320/108 |
| 8,963,488 B2* | 2/2015 | Campanella ............ H02J 5/005 |
| | | 320/108 |
| 9,266,441 B2 | 2/2016 | Abe et al. |
| 9,302,591 B2 | 4/2016 | Huang et al. |
| | (Continued) | |

OTHER PUBLICATIONS

International Search Report and Written Opinion—PCT/US2017/067929—ISA/EPO—dated Apr. 12, 2018.
(Continued)

*Primary Examiner* — Brian Ngo
(74) *Attorney, Agent, or Firm* — Colby Nipper

(57) ABSTRACT

The present disclosure describes aspects of switched-capacitor power ramping for soft switching. In some aspects, a resonant circuit of a wireless power transmitter includes a portion of capacitance that is switchable. This portion of capacitance can be disconnected from the resonant circuit to detune the resonant circuit, which may affect voltage or current flow in the resonant circuit. For example, when ramping transmitted power up or down, detuning the resonant circuit may enable an inverter of the wireless power transmitter to continuously soft switch through the power ramping process. By so doing, hard switching of the inverter can be avoided and the inverter can be implemented with lower-power or less expensive components.

30 Claims, 8 Drawing Sheets

(56) References Cited

U.S. PATENT DOCUMENTS

| | | | | |
|---|---|---|---|---|
| 2010/0148723 A1* | 6/2010 | Cook | ................... | G06K 7/0008 320/108 |
| 2013/0307473 A1* | 11/2013 | Han | ........................ | H02J 7/04 320/108 |
| 2015/0061577 A1* | 3/2015 | Ye | .......................... | H02J 7/025 320/108 |
| 2015/0256060 A1 | 9/2015 | Faingersh et al. | | |
| 2016/0068070 A1 | 3/2016 | Huang et al. | | |
| 2016/0094046 A1* | 3/2016 | Kato | ....................... | H02J 5/005 307/104 |
| 2016/0164346 A1 | 6/2016 | Zhang | | |
| 2016/0344237 A1 | 11/2016 | Cho | | |
| 2018/0212537 A1* | 7/2018 | Fukutani | ................. | H02J 7/345 |

OTHER PUBLICATIONS

Si P., et al., "A Frequency Control Method for Regulating Wireless Power to Implantable Devices," IEEE transactions on biomedical circuits and systems, vol. 2, No. 1, pp. 22-29, Mar. 2008.

Si P., et al., "Stabilizing the Operating Frequency of a Resonant Converter for Wireless Power Transfer to Implantable Biomedical Sensors", 1st International Conference on Sensing Technology, Nov. 23, 2005, pp. 477-482, XP055463852, Palmerston North, New Zealand, Retrieved from the Internet: https://pdfs.semanticscholar.org/55ef/488f623209e6ca6edf476eba89a695d692dd.pdf, Nov. 23, 2005, 6 pages.

\* cited by examiner

SWITCHED-CAPACITOR POWER RAMPING FOR SOFT SWITCHING

BACKGROUND

Field of the Disclosure

This disclosure relates generally to wireless power transfer systems, more specifically to soft switching circuitry.

Description of Related Art

This description of related art is provided for the purpose of generally presenting a context for the disclosure that follows. Unless indicated otherwise herein, concepts described in this section are not prior art to this disclosure and are not admitted to be prior art by inclusion herein.

Wireless charging systems enable the charging of portable devices (e.g., electric vehicles) when the devices are positioned near a charging pad of a base charging unit. Power is transferred from the charging pad to the device through two magnetically coupled coils, a primary coil of the charging pad and a secondary coil in the device. To do so, an inverter of the base charging unit drives the primary coil to generate a fluctuating magnetic field, which through magnetic coupling, induces voltage in the secondary coil to power the device.

Typically, the primary coil is tuned for optimal power transfer under a particular set of operating conditions, such as spatial relation to the secondary coil, secondary coil impedance, relative loading, and so on. Positioning of the device's secondary coil relative the primary coil, however, often varies each time the device is placed on the charging pad. Further, loading of the primary coil may change as the charger transitions to full charging power. As such, a reflected impedance seen from the primary coil's inverter may vary from that of the assumed operating conditions due to device positioning or charge-mode/loading transitions.

These impedance variations, which alter resonance of the primary coil's tank circuit, affect inverter operation and often result in hard-switching of the inverter's components. To accommodate voltage and/or current transients associated with hard-switching, inverters are often implemented with more-robust silicon-carbide components. These silicon-carbide components, however, lack reverse recovery charge, and are larger and more expensive than other types of silicon-based components.

SUMMARY

In some aspects, a circuit for switched-capacitor power ramping includes a coil having a first terminal connected to a first-phase-output of an inverter and a second terminal connected to a second-phase-output of the inverter. The circuit also comprises a first capacitor having a first terminal connected to the first terminal of the coil and a second terminal connected to the second terminal of the coil, and a second capacitor having a first terminal connected to the first terminal of the first capacitor. A switch of the circuit has a first terminal connected to a second terminal of the second capacitor and a second terminal connected to the second terminal of the first capacitor.

In other aspects, a method for initiating transmission of power by a wireless power transmitter includes disconnecting one of at least two parallel capacitors of a resonant circuit of the transmitter. The method sets a frequency of an inverter of the wireless power transmitter to a first frequency and initiates the transmission of the power to a wireless power receiver. An amount of the power transmitted to the wireless power receiver is then increased until a phase angle of the power in the resonant circuit reaches a predefined threshold. In response to the phase angle reaching the predefined threshold, the method connects the parallel capacitor of the resonant circuit of the wireless power transmitter and sets the frequency of the inverter to a second frequency at which the transmission of the power continues.

In yet other aspects, an apparatus for wireless power transmission comprises an inverter, a resonant circuit connected to the inverter, and a power ramp controller. The resonant circuit includes a coil connected to the inverter, first and second capacitors connected in parallel with the coil, and a switch interposed between a terminal of the second capacitor and a terminal of the coil. The power ramp controller is configured to open the switch to disconnect the second capacitor from the coil, set an operating frequency of the inverter to a first frequency, and initiate transmission of the power from the apparatus to a wireless power receiver. The power ramp controller is further configured to increase an amount of the power transmitted until a phase angle of the power in the resonant circuit is greater than 90 degrees, set the operating frequency of the inverter to a second frequency, and close the switch to connect the second capacitor in parallel with the coil. Once the power is ramped up, the power ramp controller transmits additional power from the apparatus to the wireless power receiver with the second capacitor connected and at the second frequency.

In other aspects, a circuit for continuous soft-switching comprises a coil having a first terminal connected to a first-phase-output of an inverter and a second terminal connected to a second-phase-output of the inverter. The circuit also includes a first capacitor having a first terminal connected to the first terminal of the coil and a second terminal connected to the second terminal of the coil. Switchable tuning means of the circuit include a first terminal connected to the first terminal of the coil and a second terminal connected to the second terminal of the coil. The switchable tuning means enables capacitance of the circuit to be altered and has a capacitance that is approximately three percent to twelve percent of a capacitance of the first capacitor.

The foregoing summary is provided to briefly introduce some of the aspects described herein. This summary is not intended to identify key or essential features of these or other aspects that are further described throughout the disclosure.

BRIEF DESCRIPTION OF DRAWINGS

The details of various aspects are set forth in the accompanying figures and the detailed description that follows. In the figures, the left-most digit of a reference number identifies the figure in which the reference number first appears. The use of the same reference numbers in different instances in the description or the figures indicates like elements.

DETAILED DESCRIPTION

Charging pads of conventional wireless charging systems, such as wireless electric vehicle charging (WEVC) systems, are often designed for nominal power transfer. For example, a resonant circuit and primary coil of a charging pad are typically configured to resonate with a reflected impedance of a loaded (e.g., magnetically coupled) and correctly positioned secondary coil of a receiver. The secondary coil's loading or positioning relative the primary coil, however, often varies with or during each instance of wireless charging.

In particular, when the wireless charging is initiated and the secondary coil is "open", the reflected impedance may vary enough to affect current flow and voltage of the resonant circuit while charging power is ramped up. This in turn affects operation of the charging pad's inverter, switches of which are hard switched due to the impedance-affected current and voltage of the resonant circuit and primary coil. Because of this, many charging pad inverters are implemented with more-expensive silicon-carbide parts to accommodate the hard switching or forced to operate at unregulated frequencies.

This disclosure describes aspects of switched-capacitor power ramping for soft switching. Apparatuses and techniques described herein may implement a resonant circuit of a wireless power transmitter that includes a portion of capacitance that is switchable. In some scenarios, such as when charging power is ramped up to, or down from, a nominal level, this portion of capacitance can be disconnected from the resonant circuit to detune the resonant circuit. Detuning the resonant circuit can be effective to maintain a normal voltage and current phase relationship in the resonant circuit and primary coil. As such, an inverter driving the detuned resonant circuit can soft switch continuously through the power ramping cycle and avoid hard switching. By so doing, the inverter can be implemented with less-robust and more cost effective components.

These and other aspects of switched-capacitor power ramping for soft switching are described below in the context of an example environment, example resonant circuits, and techniques. Any reference made with respect to the example environment or circuit, or elements thereof, is by way of example only and is not intended to limit any of the aspects described herein.

Example Environment

Figure 1:
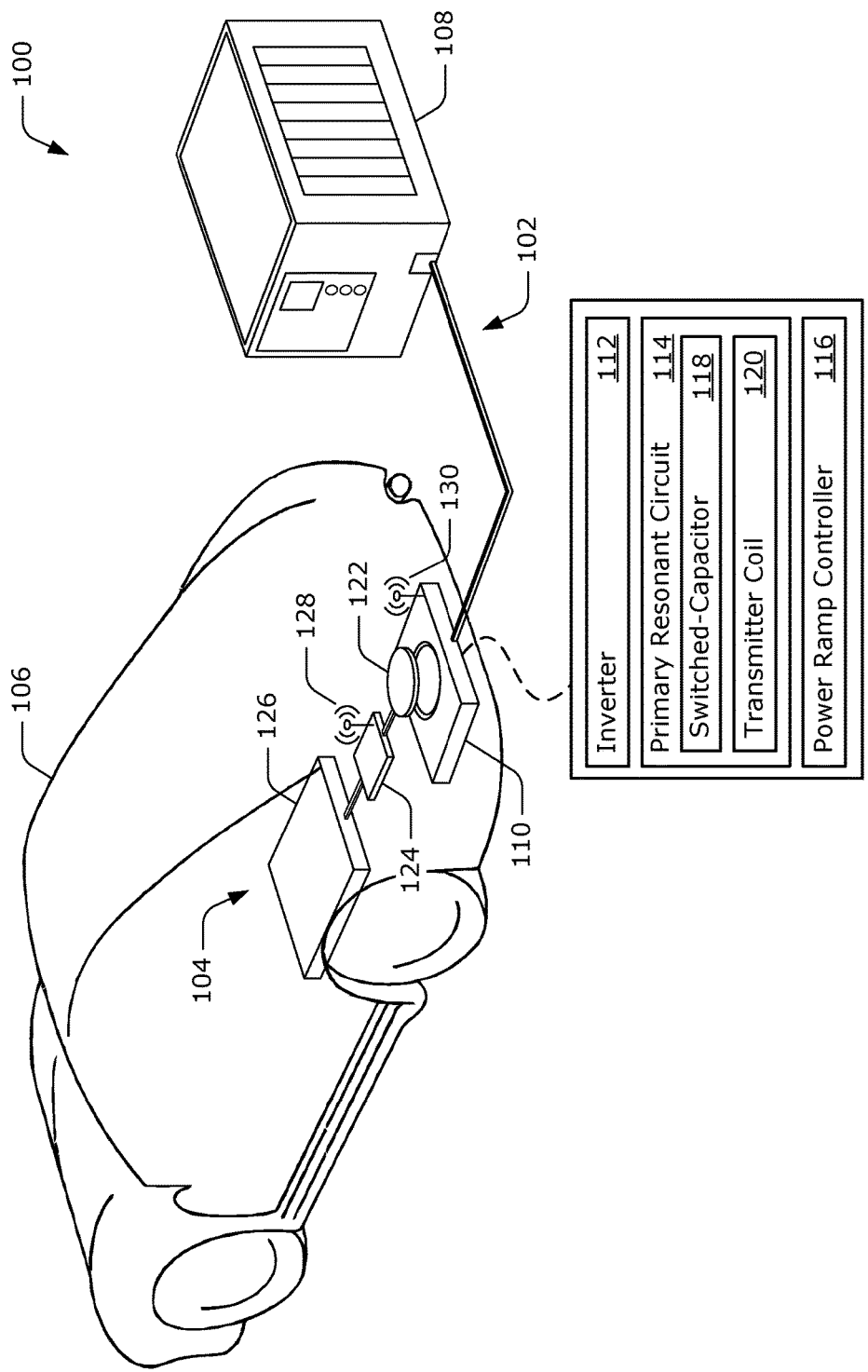
FIG. 1 illustrates an example environment that includes a wireless power charging system in accordance with one or more aspects.

FIG. 1 illustrates an example environment in which a wireless charging system 100 is implemented in accordance with one or more aspects. The wireless charging system 100 includes a wireless power transmitter 102 and a wireless power receiver 104. In this particular example, the wireless power receiver 104 is embodied in an electric vehicle 106, and the wireless charging system 100 may be implemented as a wireless electric vehicle charging (WEVC) system. Although described with reference to an electric or hybrid vehicle, the wireless charging system 100 may be implemented or scaled to transfer power to any suitable receiver, such as a smart-phone, laptop computer, tablet computer, home appliance, power utility or grid device, and the like.

The wireless power transmitter 102 includes a power source 108 and a charging pad 110. The power source 108 may provide direct current (DC) power or alternating current (AC) power to the charging pad 110. In some cases, the power source 108 includes circuitry for rectification, filtering, or power-factor correction of AC power received from household or commercial AC mains. Alternately or additionally, the power source 108 may provide power to multiple charging pads, either directly or through a common power bus that connects the multiple charging pads.

The charging pad 110 includes an inverter 112, primary resonant circuit 114 (or primary tank circuit), and a power ramp controller 116. Although shown embodied in the charging pad 110, each of these entities may be implemented separate from the charging pad 110 as individual components or combined with others, such as the power source 108. The inverter 112 converts DC power or low frequency AC power provided by the power source 108 to higher frequency (e.g., 20 kHz-120 kHz) AC power suitable for driving the primary resonant circuit 114.

The primary resonant circuit 114 may include a switched-capacitor 118, transmitter coil 120, and other tuning components (not shown). Generally, the inverter 112 provides AC power at or near a resonant frequency of the primary resonant circuit 114 to facilitate transmission of power from the transmitter coil 120 to a receiver coil 122 of the wireless power receiver. The primary resonant circuit 114 and a secondary resonant circuit coupled to the receiver coil 122 may be configured according to a mutual resonant relationship. In some cases, when the resonant frequency of the primary resonant circuit 114 and the resonant circuit of the receiver coil 122 are substantially the same or very close, transmission losses between the transmitter coil 120 and the receiver coil 122 are reduced.

The switched-capacitor 118 may include a portion of parallel capacitance of the primary resonant circuit 114 that can be disconnected to alter a tuning of the circuit. The switched-capacitor 118 may include any suitable portion, fraction, or percentage of the parallel capacitance of the primary resonant circuit 114. For example, a capacitance of the switched-capacitor 118 may range from approximately one percent to fifty percent of a total amount of parallel capacitance of the primary resonant circuit. In other cases, a capacitance of the switched-capacitor 118 may range from approximately fifty percent to ninety nine percent of a total amount of parallel capacitance of the primary resonant circuit. Alternately or additionally, although shown as a single capacitor, switched-capacitance may be implemented with any suitable number of switched-capacitor elements having same or different respective capacitance values.

Although described with reference to a parallel configuration, aspects described herein may also be implemented through a switched series capacitor or switched series inductor for tuning of a resonant circuit. In some aspects, the power ramp controller 116 manages a frequency of the inverter 112 or tuning of the primary resonant circuit 114 via the switched-capacitor 118 to enable wireless charging or power transfer at or near the resonant frequency. How the power ramp controller 116 and switched-capacitor 118 are implemented and used varies, and is described throughout the disclosure.

In some aspects, a battery management system 124 of the wireless power receiver 104 rectifies the AC power received by the receiver coil 122 to provide DC power to charge a battery 126 of the electric vehicle 106. Alternately or additionally, the battery management system 124 of the wireless power receiver 104 may include a wireless interface 128 configured to establish a communication link with a wireless interface 130 of the charging pad 110. The battery management system 124 and charging pad 110 can communicate to exchange any suitable information, such as respective coil configurations, coil power ratings, vehicle alignment or positioning information, charging status, fault states, a status of the battery 126, and the like. The communication link may be implemented through one or more wireless networks, such as a wireless local-area-network, peer-to-peer (P2P) network, cellular network, and/or wireless personal-area-network (WPAN).

Figure 2:
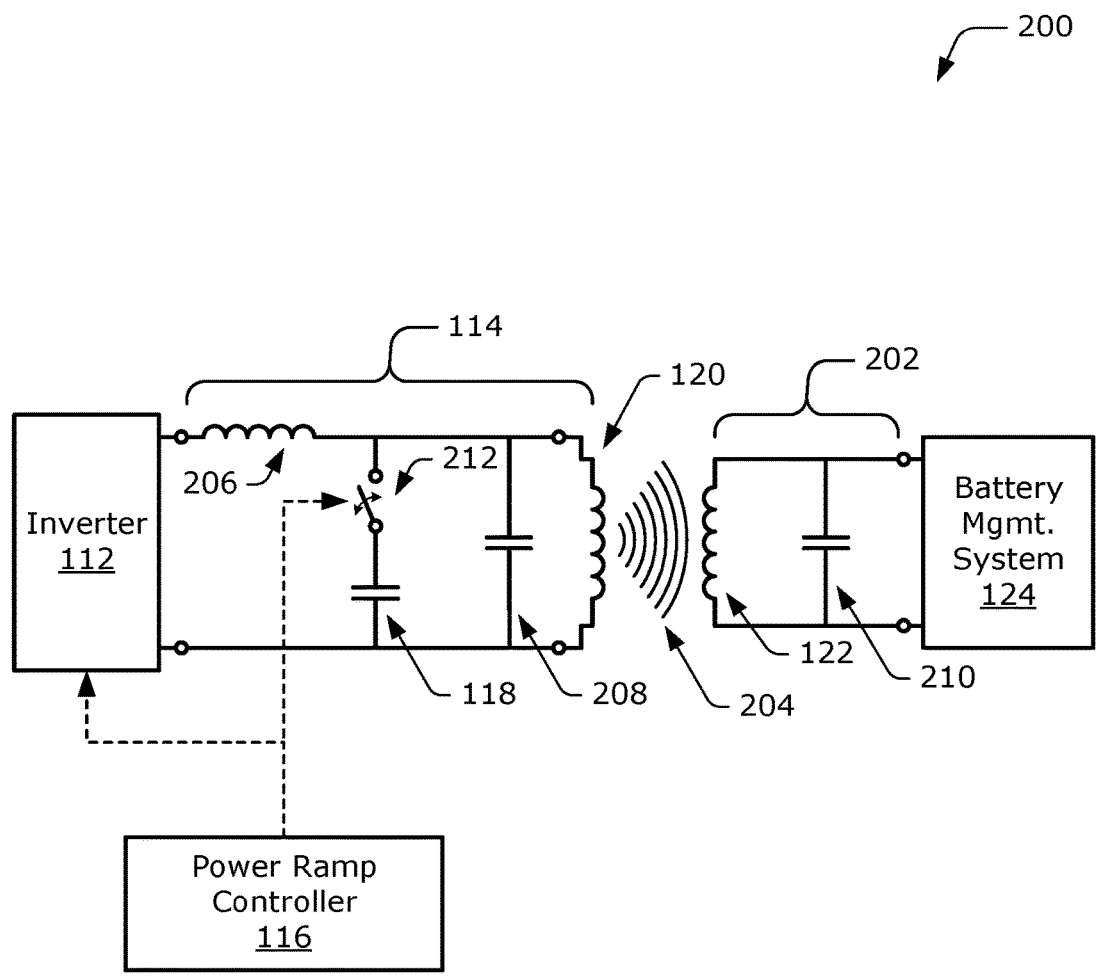
FIG. 2 illustrates an example configuration of a resonant circuit capable of continuous soft switching.

FIG. 2 illustrates an example configuration of a resonant circuit capable of continuous soft switching at 200. In this particular example, the primary resonant circuit 114 is transmitting power to a secondary resonant circuit 202 (secondary tank circuit) via a time-varying magnetic (or electromagnetic) field 204. The time-varying magnetic field 204 may be generated in accordance with various spectrum allocations or safety guidelines, such as within a frequency band of 81.3 kHz to 90 kHz. An amount of power transmitted or transferred from the primary resonant circuit 114 to the secondary resonant circuit 202 may also vary or depend on respective coil configurations. The respective power ratings of the transmitter coil 120 and receiver coil 122 may be similar or different, and range from 1 kW to over 30 kW depending on a configuration of the wireless charging system 100.

The inverter 112 converts DC power or low frequency AC power to AC power having a frequency at or near a resonant frequency of the primary resonant circuit 114. The inverter 112 drives the primary resonant circuit 114 with the AC power (e.g., controlled frequency current) to transfer the power via the transmitter coil 120 to the receiver coil 122. The inverter 112 may be implemented via any suitable topology or device types, such as an H-bridge of isolated-gate bipolar transistor (IGBT) or metal-oxide-semiconductor field-effect transistors (MOSFETs). The apparatuses and techniques described herein may enable continuous soft switching, which permits the inverter to be implemented with such devices.

In this particular example, the primary resonant circuit 114 is implemented as an inductor-capacitor-inductor (LCL) network that includes a series inductor 206 and a parallel capacitor 208. Respective values of the series inductor 206 and parallel capacitor 208 may be selected such that an impedance or resonance of the primary resonant circuit 114 matches or approximates that of the secondary resonant circuit 202 that includes parallel capacitor 210. Although shown as an LCL network, the primary resonant circuit 114 may be implemented as any suitable type of resonant network for inductive power transfer.

The primary resonant circuit 114 also includes a switch 212 that enables the switched-capacitor 118 to be connected or disconnected from the primary resonant circuit. The switch 212 may be implemented with any suitable type or combination of switch components, such as bipolar-junction transistors (BJTs), isolated-gate bipolar transistors (IGBTs), reverse-blocking IGBTs (RB-IGBTs), metal-oxide-semiconductor field-effect transistors (MOSFETs), silicon carbide (SiC) MOSFETs, and the like.

In some cases, opening switch 212 to disconnect the switched-capacitor 118 from the primary resonant circuit 114 detunes the primary resonant circuit 114. For example, the power ramp controller 116 may control switch 212 to disconnect the switched-capacitor 118 from the primary resonant circuit during power ramping when wireless charging is initiated. By so doing, the primary resonant circuit 114 may appear inductively detuned from the inverter's 112 perspective. This may be effective to ensure that voltage leads current through the primary resonant circuit 114 during power ramping sequences, thereby enabling the inverter to continuously soft switch at zero-voltage switch points (e.g., zero-voltage switching (ZVS)). Alternately or additionally, the primary resonant circuit 114 can be detuned or retuned to enable other types of soft switching, such as zero-current switching (ZCS).

The time-varying magnetic field 204 generated by the transmitter coil 120 of the primary resonant circuit 114 induces current flow in the receiver coil 122 of the secondary resonant circuit 202. The transmitter coil 120 and receiver coil 122 may be configured as any suitable types of coils, such as circular, circular-rectangular, bi-polar (e.g., double-D or DD), quadrature, or any combination thereof. The battery management system 124 can rectify the power received by the receiver coil 122 and charge the battery 126 of the electric vehicle 106.

Figure 3:
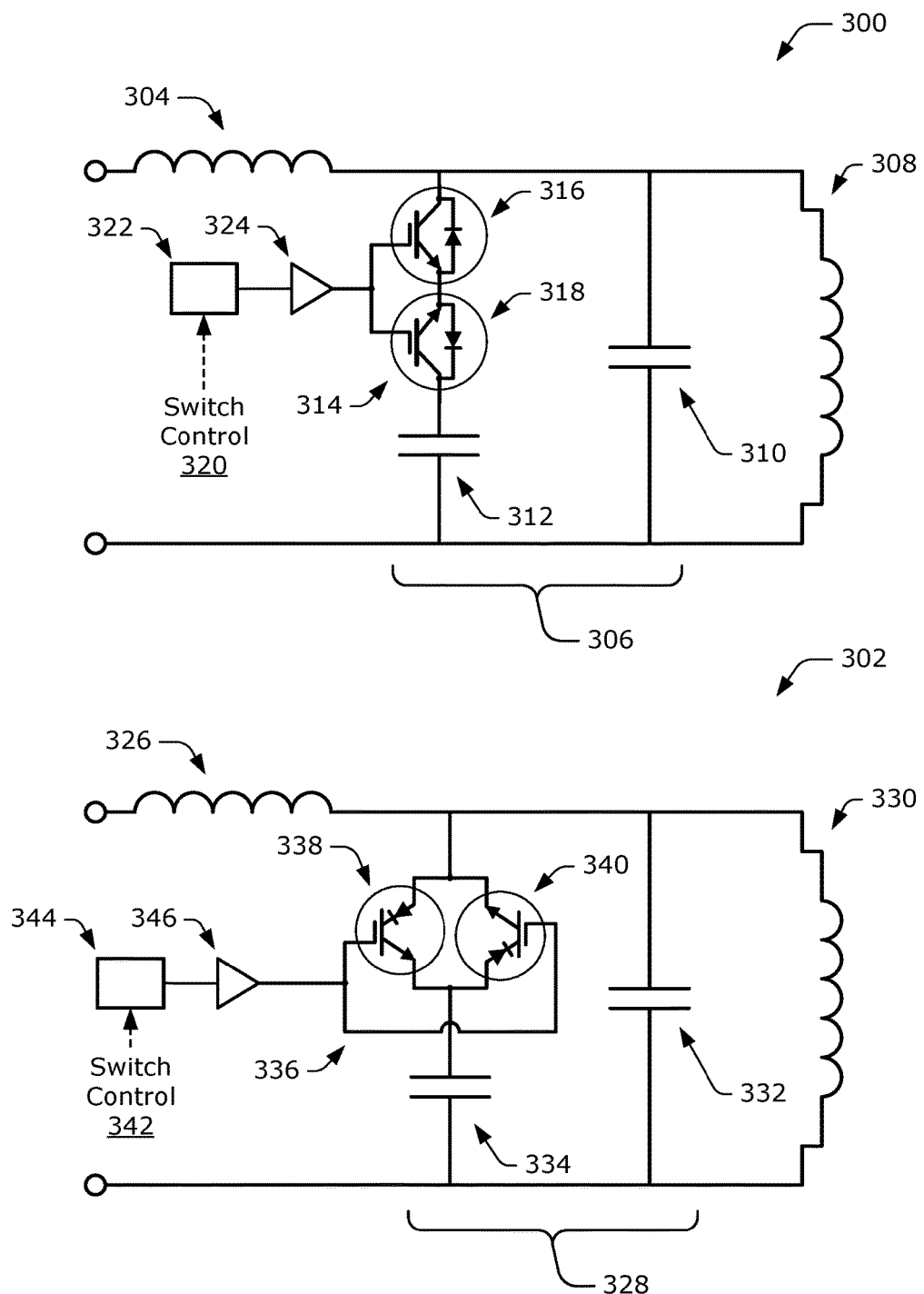
FIG. 3 illustrates example resonant circuits that include a switched-capacitor in accordance with one or more aspects.

FIG. 3 illustrates example resonant circuits that include a switched-capacitor at 300 and 302. Although shown as being implemented with particular types of resonant networks or switching components, aspects of switched-capacitor power ramping can be implemented with any suitable tuning structure that enable detuning or retuning of a resonant circuit. Alternately or additionally, aspects or switched-capacitor power ramping or power transfer may also be implemented in secondary resonant circuits, such as those of a wireless power receiver.

The first resonant circuit 300 includes a series inductor 304, parallel capacitance 306, and a coil 308. The resonant circuit 300 may be tuned for resonance at any suitable frequency, such as a frequency within a range of 81.3 kHz to 90 kHz or a standardized frequency band for inductive power transfer. The parallel capacitance of the resonant circuit 300 includes a first capacitor 310 and a second capacitor 312. A value of the second capacitor 312 may range from approximately three to fifteen percent of a capacitance of the first capacitor 310.

The resonant circuit 300 also includes a switch 314 that enables the second capacitor 312 to be connected or disconnected from the resonant circuit 300. In some aspects, this enables the power ramp controller 116 to detune or retune the resonant circuit 300. In this particular example, the switch 314 is formed by two isolated-gate bipolar transistors 316 and 318 (IGBTs 316 and 318) that are connected in reverse. Although shown as being implemented with IGBT-type switch components, the switch 314 may also be implemented with BJTs, RB-IGBTs, MOSFETs, SiC MOSFETs, SiC switches, and the like. A switch control signal 320 can be isolated from AC circuitry or high voltage by isolation circuitry 322. Gate drive circuitry 324 of the circuit can amplify the isolated switch control signal 320 to control operation of the switch 314 and thus the connection of the second capacitor 312 to the resonant circuit 300. For example, the power ramp controller 116 generate or manipulate the switch control signal 320 to manage tuning of the resonant circuit 300.

The second resonant circuit 302 includes a series inductor 326, parallel capacitance 328, and a coil 330. The resonant circuit 302 may be tuned for resonance at any suitable frequency, such as a frequency within a range of 81.3 kHz to 90 kHz or a standardized frequency band for inductive power transfer. The parallel capacitance of the resonant circuit 300 includes a first capacitor 332 and a second capacitor 334. A value of the second capacitor 334 may range from approximately five to ten percent of a capacitance of the first capacitor 310.

The resonant circuit 302 also includes a switch 336 that enables the second capacitor 334 to be connected or disconnected from the resonant circuit 300. In some aspects, this enables the power ramp controller 116 to detune or retune the resonant circuit 302. In this particular example, the switch 336 is formed by two reverse-blocking isolated-gate bipolar transistors 338 and 340 (RB-IGBTs 338 and 340). Although shown as being implemented with RB-IGBT switch components, the switch 336 may also be implemented with BJTs, IGBTs, MOSFETs, SiC MOSFETs, SiC switches, and the like. A switch control signal 342 can be isolated from AC circuitry or high voltage by isolation circuitry 344 (e.g., opto-couplers). Gate drive circuitry 346 of the circuit can amplify the isolated switch control signal 342 to control operation of the switch 336 and thus the connection of the second capacitor 334 to the resonant circuit 302. For example, the power ramp controller 116 generate or manipulate the switch control signal 342 to manage tuning of the resonant circuit 300.

Techniques of Switched-Capacitor Power Ramping for Soft Switching

The following techniques of switched-capacitor power ramping for soft switching may be implemented using any of the previously described elements of the example environment, components, or circuits. Reference to elements, such as the inverter 112, power ramp controller 116, switched-capacitor 118, or transmitter coil 120, is made by example only and is not intended to limit the ways in which the techniques can be implemented.

The techniques are described with reference to example methods illustrated in FIGS. 4, 6, and 7 which are depicted as respective sets of operations or acts that may be performed by entities described herein. The operations described herein may be performed using any suitable circuitry or component, which may provide means for implementing one or more of the operations. The depicted sets of operations illustrate a few of the many ways in which the techniques may be implemented. As such, operations of a method may be repeated, combined, separated, omitted, performed in alternate orders, performed concurrently, or used in conjunction with another method or operations thereof.

Figure 4:
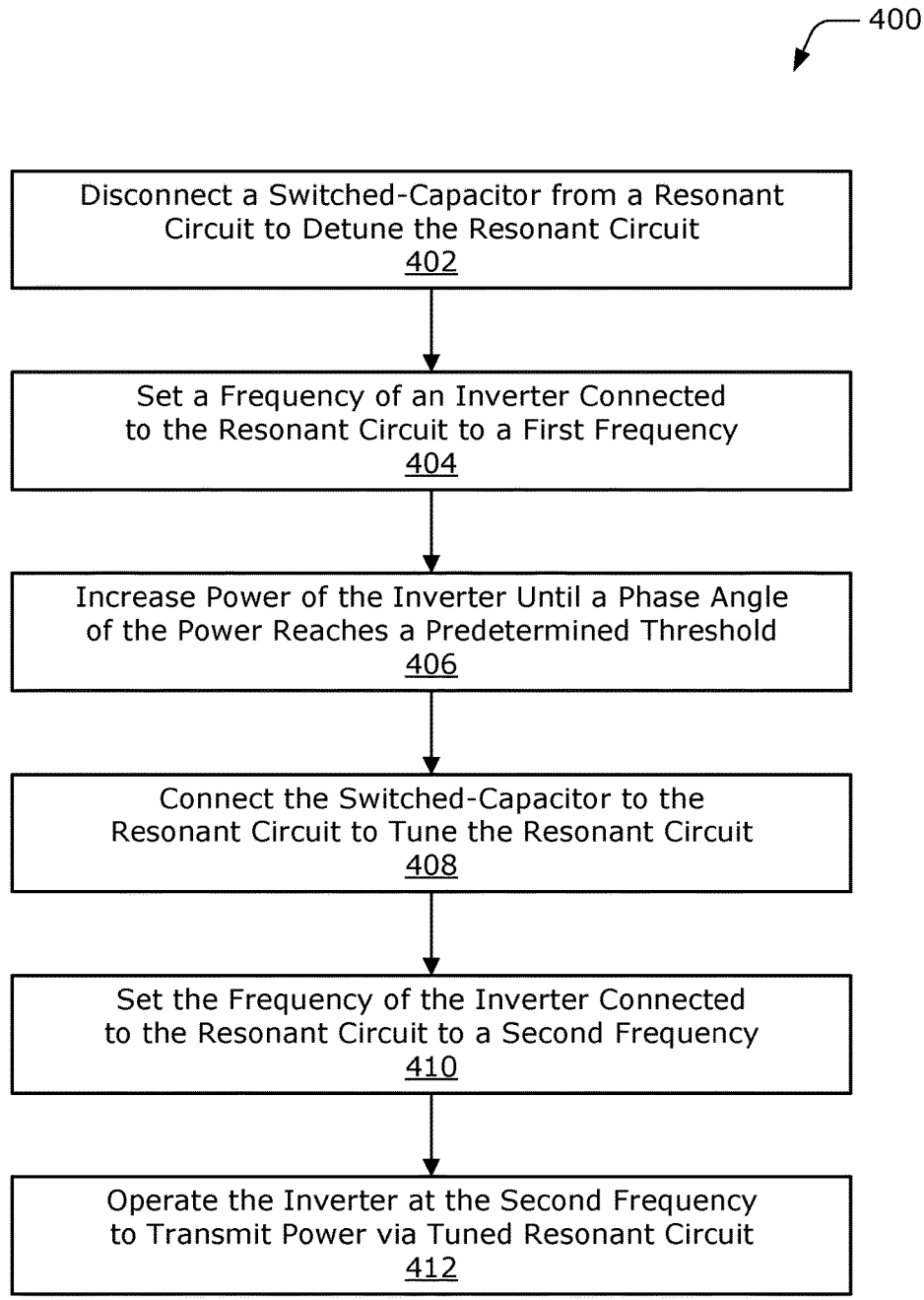
FIG. 4 illustrates an example method for ramping up transmitted power with continuous soft-switching.

FIG. 4 illustrates an example method 400 for ramping up transmitted power with continuous soft-switching, including operations performed by the power ramp controller 116.

At 402, a switched-capacitor is disconnected from a resonant circuit. This may be effective to detune the circuit or alter a frequency at which the resonant circuit resonates. The switched-capacitor may be connected in parallel with a transmitting coil of the resonant circuit (e.g., primary tank). The switched-capacitor may comprise a portion of parallel capacitance of the resonant circuit, such as approximately three to ten percent of a total amount of parallel capacitance. Alternately or additionally, the resonant circuit may include multiple switched-capacitors, which may be disconnected or connected to further adjust tuning of the resonant circuit.

By way of example, consider the wireless charging system 100 of FIG. 1 in which the EV 106 is positioned over the charging pad 110. Here, assume that a battery 126 of the EV 106 is low and that the EV 106 just parked in order to recharge its battery 126. Prior to charging, the charging pad 110 may detect the EV 106 and determine a configuration of the receiver coil 122. Before charging is initiated by the charging pad 110, the power ramp controller 116 disconnects switched-capacitor 118 of the primary resonant circuit 114 (e.g., tank circuit of the charging pad).

At 404, a frequency of an inverter connected to the resonant circuit is set to a first frequency. The first frequency may be a frequency for which the resonant circuit is not tuned. The resonant circuit may not be tuned for the first frequency with the switched-capacitor connected or disconnected. In some cases, the first frequency is within a range of standard or regulated frequencies, such as 81.3 kHz to 90 kHz (e.g., for regulatory compliance). In the context of the present example, the power ramp controller 116 sets a frequency of the inverter 112 to 90 kHz.

At 406, power of the inverter is increased until a phase angle of the power reaches a predefined threshold (or predetermined threshold). The phase angle between the voltage and current can be increased to any suitable angle to ensure that voltage leads the current flowing through the resonant circuit. In some cases, the predefined threshold of the phase angle ranges from 90 to 125 degrees. In other cases, the predefined threshold may range from 125 to 145 degrees.

Continuing the ongoing example, the power ramp controller starts the process of transmitting power to the receiver coil 122 of the EV 106 and ramps up the power of the inverter 112 until a phase angle of the power reaches approximately 135 degrees. Here, note that with the switched-capacitor 118 disconnected and the inverter 112 operating at 90 kHz, the inverter 112 is able to continuously soft switch during the power ramp process. As such, the inverter 112 can be implemented with devices that are less-robust and more cost effective than silicon-carbide devices, which are typically implemented to handle transients associated with hard switching.

At 408, the switched-capacitor is connected to the resonant circuit. This may be effective to tune the resonant circuit or alter the frequency at which the resonant circuit resonates. In some cases, connecting the switched-capacitor is responsive to the phase angle reaching the defined threshold. Tuning the resonant circuit for resonance may increase an efficiency at which the primary coil transmits power to a secondary coil of a receiver. In the context of the present example, the power ramp controller 116 connects the switched-capacitor 118 into the resonant circuit 114 to enable nominal or optimal power transfer to the receiver coil 122.

At 410, the frequency of the inverter connected to the resonant circuit is set to a second frequency. The second frequency may be a frequency for which the resonant circuit is tuned, such as for optimal power transfer. The resonant circuit may be tuned for the second frequency with the switched-capacitor connected or disconnected. In some cases, the second frequency is within a range of standard or regulated frequencies, such as 81.3 kHz to 90 kHz (e.g., for regulatory compliance). In the context of the present example, the power ramp controller 116 sets a frequency of the inverter 112 to 85 kHz for nominal power transfer.

At 412, the inverter is operated at the second frequency to transmit power via the tuned resonant circuit. This may be effective to maximize an efficiency or an amount of power transferred from the resonant circuit's coil to a receiving coil. Alternately or additionally, when the transmitting coil and receiving coil are mismatched or misaligned, the switched-capacitor may be left open should such a condition result in hard switching of the inverter. In some cases, the use of a switched-capacitor enables a transformer ratio of the coils to be reduced versus other detuning methods.

Figure 5:
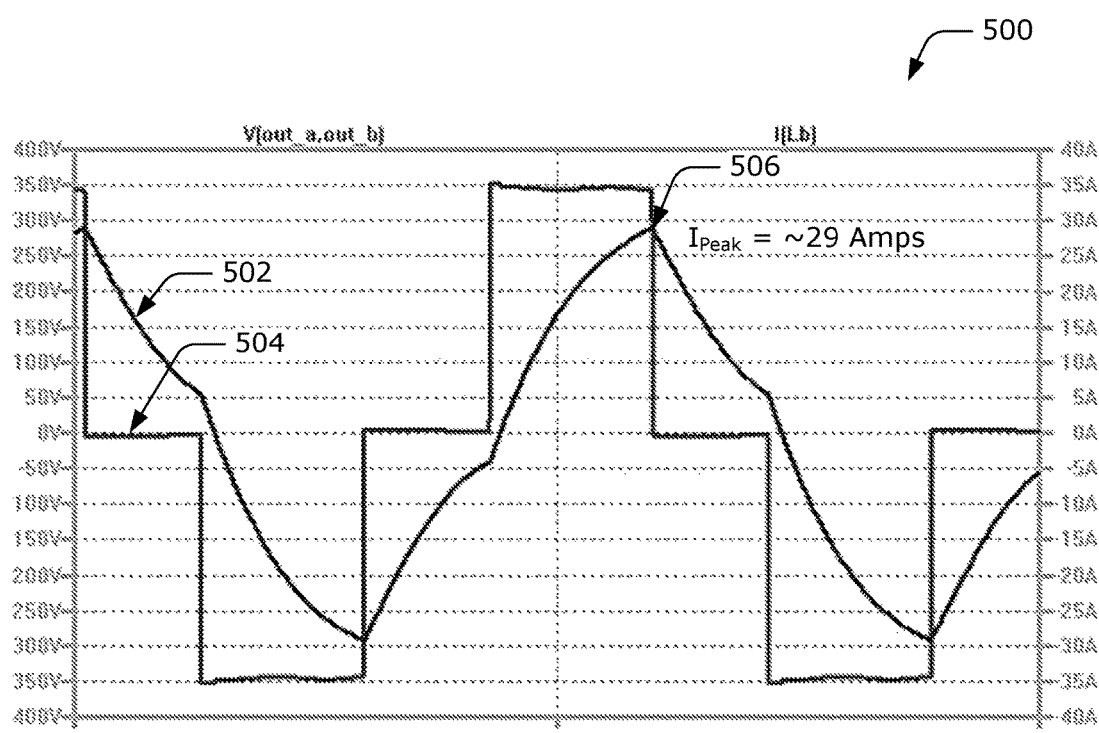
FIG. 5 illustrates example current and voltage waveforms associated with a resonant circuit tuned in accordance with one or more aspects.

For example, consider FIG. 5 which illustrates voltage and current waveforms of a soft switching inverter at 500. Here, voltage 502 leads current 504 during the switching process, which enables the inverter to soft switch. A reduced transformer ratio, such as one enabled by switched-capacitor power ramping, may lead to a reduction of peak current in, or voltage across, a primary coil. In this example, peak current 506 in the primary coil is reduced by approximately ten percent and voltage across the primary coil is reduced by approximately five percent. This is but one example of improved performance associated with switched-capacitor power ramping, and other implementations or configurations may result in different reductions or alterations of current in, or voltage across, a primary coil or other components of a primary resonant circuit. Concluding the present example, the power ramp controller 116 continues to charge the EV 106 with the primary resonant circuit 114 tuned and the inverter set to 85 kHz for nominal power transfer.

Figure 6:
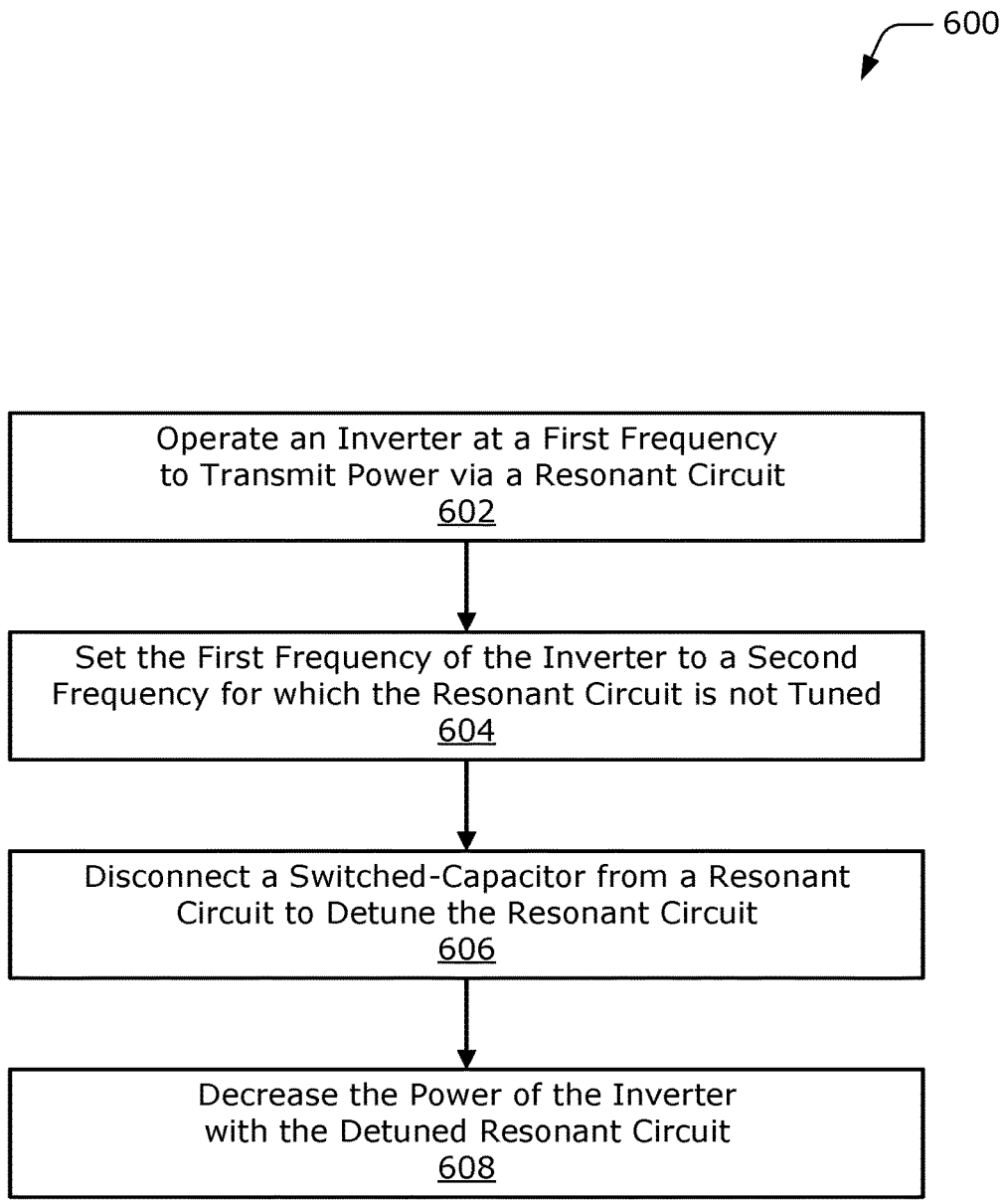
FIG. 6 illustrates an example method for ramping down transmitted power with continuous soft-switching.

FIG. 6 illustrates an example method 600 for ramping down transmitted power with continuous soft-switching, including operations performed by the power ramp controller 116.

At 602, an inverter of a wireless power transmitter is operated at a first frequency to transmit power via a resonant circuit. The first frequency may be a resonant frequency of the resonant circuit that is connected to the inverter. In some cases, the resonant circuit includes a switched-capacitor that enables tuning of the resonant circuit to be altered or adjusted. The first frequency may be a frequency that enables optimal or nominal power transfer by the wireless power transmitter.

At 604, the frequency of the inverter is set to a second frequency for which the resonant circuit is not tuned. The resonant circuit may not be tuned for the second frequency with the switched-capacitor connected or disconnected. In some cases, the second frequency is within a range of standard or regulated frequencies, such as 81.3 kHz to 90 kHz (e.g., for regulatory compliance).

At 606, a switched-capacitor is disconnected from the resonant circuit to detune the resonant circuit. This may be effective to detune the circuit or alter a frequency at which the resonant circuit resonates. The switched-capacitor may comprise a particular amount of parallel capacitance of the resonant circuit, such as approximately three to ten percent of a total amount of parallel capacitance. Alternately or additionally, the resonant circuit may include multiple switched-capacitors, which may be disconnected or connected to further adjust tuning of the resonant circuit.

At 608, the power of the inverter is decreased with the detuned resonant circuit. The power may be ramped down from a nominal power level until the transmission of power ceases or is terminated. In some aspects, decreasing the power while operating at the second frequency or with the resonant circuit detuned is effective to ensure that voltage leads current flow through the resonant circuit. By so doing, the inverter may continuously soft switch while the power is ramped down. This can be effective to not only enable the use of less expensive switching components (e.g., CMOS or IGBT H-bridge) to implement the inverter, but allow the inverter to operate with a regulated frequency band while ramping power.

Figure 7:
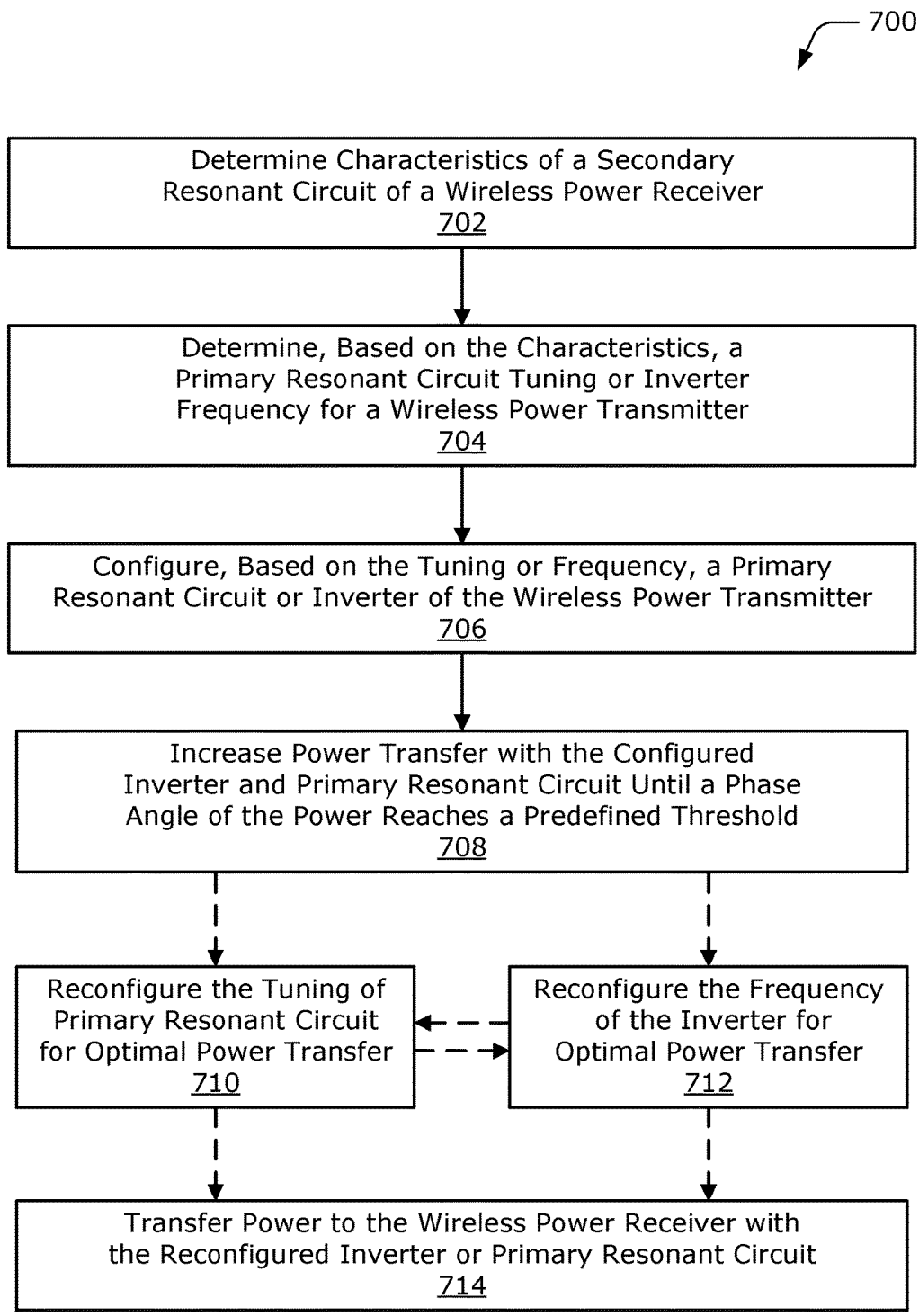
FIG. 7 illustrates an example method for configuring a primary resonant circuit based on characteristics of a secondary resonant circuit.

FIG. 7 illustrates an example method 700 for configuring a primary resonant circuit based on characteristics of a secondary resonant circuit, including operations performed by the power ramp controller 116.

At 702, characteristics of a secondary resonant circuit of a wireless power receiver are determined. A charging pad or controller of a wireless power transmitter may communicate with the receiver to determine the characteristics of the secondary resonant circuit or the circuit's receiving coil. The characteristics may include any suitable information, such as a configuration of the receiving coil, a power rating of the receiving coil, alignment or spacing of the receiving coil with respect to a transmitting coil, and so on.

At 704, a primary resonant circuit tuning or inverter frequency is determined based on the characteristics of the secondary resonant circuit. The tuning or frequency may be determined such that soft switching is maintained during power ramping operations between the wireless power transmitter and the wireless power receiver. For example, when the transmitter coil and receiver coil have matching impedances, the resonant circuit may be detuned via a switched-capacitor. Alternately, if the primary coil and secondary coil are mismatched, the primary resonant circuit may be left in a tuned configured during power ramping.

At 706, a primary resonant circuit or inverter of the wireless power transmitter are configured based on the determined tuning or frequency. Prior to initiating the transmission of power, the primary resonant circuit can be configured such that hard switching is prevented. In some cases, configuring the primary resonant circuit includes connecting a switched-capacitor to or disconnecting a switched-capacitor from the primary resonant circuit.

At 708, power transfer is increased with the configured inverter and through the primary resonant circuit until a phase angle of the power reaches a predefined threshold. In some cases, increasing or ramping power with the configured primary resonant circuit is effective to prevent the inverter from hard switching. The predefined phase angle may be any suitable angle, such as a phase angle that ranges from 120 degrees to 140 degrees.

In some aspects, the method 700 may continue to transfer power with the detuned resonant circuit and/or at the first frequency. For example, when the primary coil and secondary coil are mismatched (e.g., 10 kW primary coil and a 3 kW secondary coil) the wireless power transmitter may use the adjustable tuning of the resonant circuit with a particular frequency to facilitate charging of a vehicle with a dissimilar receiving coil. Thus, some aspects of switched-capacitor power ramping may increase interoperability of a wireless charging system.

Optionally at 710, the tuning of the primary resonant circuit is reconfigured for optimal power transfer. In some cases, this includes connecting a switched-capacitor to the primary resonant circuit. In other cases, the switched-capacitor may be disconnected from the primary resonant circuit if such tuning improves power transfer (e.g., for coils of differing size, impedance, or power). In some cases, operation 710 is repeated to switch different ones of multiple switched-capacitors in order to tune the primary resonant circuit. From operation 710, the method 700 may proceed (or return) to operation 712 or proceed to operation 714 to transfer power with the tuned resonant circuit.

Optionally at 712, the frequency of the inverter is reconfigured for optimal power transfer. Reconfiguring the inverter may include altering or adjusting a frequency at which the inverter operates effective to achieve optimal power transfer. An optimal frequency may be predetermined or dynamically determined by the power ramp controller, such as by stepping the frequency (e.g., 100 Hz or 500 Hz increments) until power transfer is optimized. In some cases, the optimal frequency for power transfer is approximately a resonant frequency of the primary resonant circuit. Alternately or additionally, the inverter can be set to a frequency within a particular range or band, such as 81.3 kHz to 90 kHz (e.g., for regulatory compliance). From operation 712, the method may proceed (or return) to operation 710 to reconfigure or adjust tuning of the primary resonant circuit or proceed to operation 714 to transfer power with the reconfigured inverter.

At 714, power is transferred to the wireless power receiver with the reconfigured inverter and/or primary resonant circuit. As noted, either of the inverter or the primary resonant circuit may be reconfigured for nominal power transfer. In some cases, both the inverter and tuning of the primary resonant circuit are configured or reconfigured for optimal or nominal power transfer. Configuring or reconfiguring the primary resonant circuit may be effective to enable the inverter to soft switch during a power ramping process or algorithm. By so doing, hard switching can be avoided and the inverter may be implemented with less-robust or less expensive components.

Charge Control System

Figure 8:
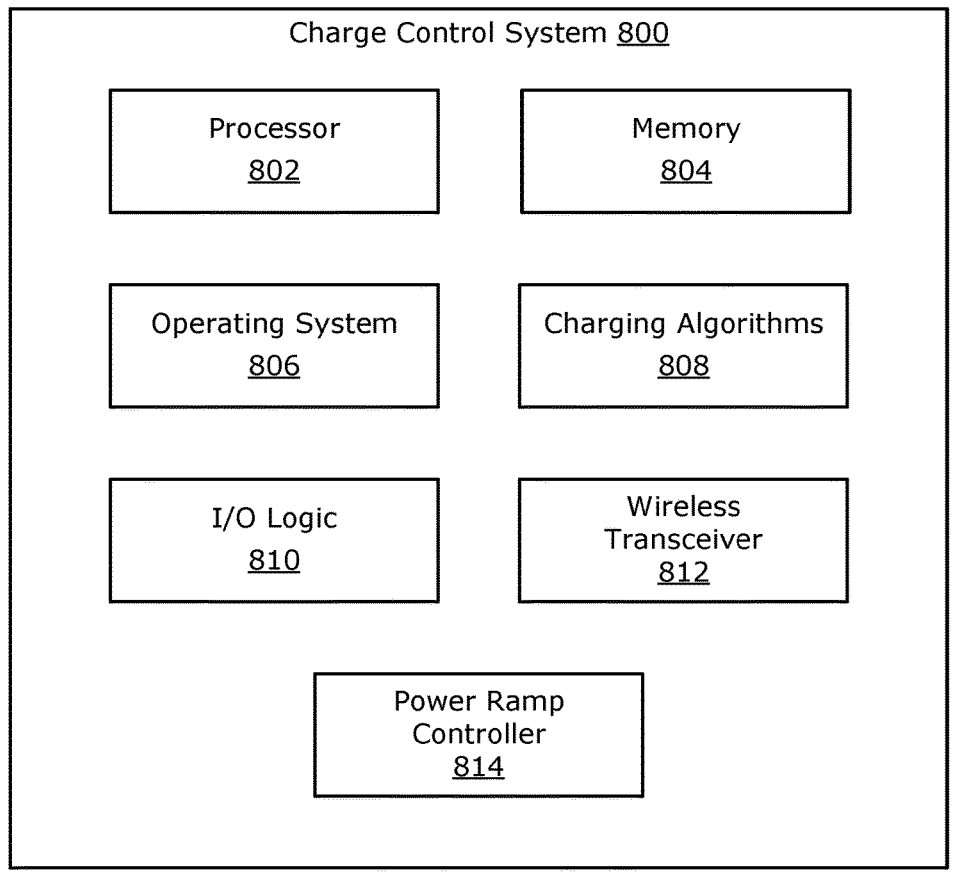
FIG. 8 illustrates an example charge control system in accordance with one or more aspects.

FIG. 8 illustrates an example charge control system 800, which includes components capable of implementing aspects of switched-capacitor power ramping for soft switching. Entities of the charge control system 800 may be implemented combined or separately in any suitable structure, such as a system-on-chip (SoC), application specific integrated-circuit (ASIC), power management IC (PMIC), printed circuit board assembly (PCBA), embedded system, and the like. The charge control system 800 may also be implemented as, or in, any suitable charging or power transfer device, such as a WEVC system, charging pad, transmitter pad, power inverter, power converter, inductive power transfer (IDT) device, wireless power transmitter, induction-based appliance, or any other device that may implement switched-capacitor power ramping.

The charge control system 800 may be integrated with a microprocessor, storage media, I/O logic, data interfaces, logic gates, a power transmitter, a power receiver, circuitry, firmware, software, or combinations thereof to provide communicative, control, or processing functionalities. The charge control system 800 may include a data bus (e.g., cross bar or interconnect fabric) enabling communication between the various components of the charge control system 800 and other components of a wireless charging system. In some aspects, the charge control system 800 may communicate with a wireless power receiver or a controller thereof to implement switched-capacitor power ramping.

In this particular example, the charge control system 800 includes a processor 802 and memory 804. The memory 804 may include any suitable type of memory, such as volatile memory (e.g., DRAM), non-volatile memory (e.g., Flash), and the like. The memory 804 are implemented as a storage medium, and thus do not include transitory propagating signals or carrier waves. The memory 804 can store data and processor-executable instructions of the charge control system 800, such as an operating system 806 of the system and charging algorithms 808. The charging algorithms 808 may include various charging profiles and tuning parameters to enable interoperability between the charge control system 800 and multiple types or sizes of wireless power receivers. The processor 802 executes the operating system 806 and charging algorithms 808 from the memory 804 to implement various functions of a wireless charging system associated with the charge control system 800.

The charge control system 800 may also include I/O logic 810 and a wireless transceiver 812. The I/O logic 810 can be configured to provide a variety of I/O ports or data interfaces to enable communication with other components of a wireless charging system, such as a power supply, sensors, power transmitting device, or power receiving device. The wireless transceiver 812 may also enable communication with other components of the wireless charging system or a control system of a wireless power receiver. For example, the charge control system 800 may communicate with a charge controller of an electric vehicle (EV) to determine a rating or configuration of the EVs wireless charging system and receiver coil.

The charge control system 800 also includes a power ramp controller 814, which may be embodied separately or combined with other components described herein. For example, the power ramp controller 814 may be integrated with or have access to the charging algorithms 808 of the charge control system 800. The power ramp controller 814, either independently or in combination with other components, can be implemented as processor-executable instructions stored in the memory 804 and executed by the processor 802 to implement switched-capacitor power ramping or operations described herein. Alternately or additionally, the power ramp controller 814 and other components of charge control system 800 may be implemented as hardware, fixed-logic circuitry, firmware, or a combination thereof that is implemented in association with I/O logic 810 or other signal processing circuitry of the charge control system.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A circuit for continuous soft-switching in a wireless power transmitter, the circuit comprising:
   a coil having a first terminal connected to a first-phase-output of an inverter and a second terminal connected to a second-phase-output of the inverter;
   a first capacitor having a first terminal connected to the first terminal of the coil and a second terminal connected to the second terminal of the coil;
   a second capacitor having a first terminal connected to the first terminal of the first capacitor;
   a switch having a first terminal connected to a second terminal of the second capacitor and a second terminal connected to the second terminal of the first capacitor; and
   a power ramp controller coupled to the switch, the power ramp controller configured to control the switch to provide soft switching of the inverter.

2. The circuit as recited in claim 1, wherein a capacitance value of the second capacitor is approximately five percent to ten percent of a capacitance value of the first capacitor.

3. The circuit as recited in claim 1, wherein a capacitance value of the second capacitor is approximately three percent to twelve percent of a capacitance value of the first capacitor.

4. The circuit as recited in claim 1, wherein the switch is implemented using an isolated-gate bipolar transistor (IGBT) or a reverse-blocking IGBT (RB-IGBT).

5. The circuit as recited in claim 4, further comprising:
   gate drive circuitry having an output connected to a gate of the IGBT or the RB-IGBT; and isolation circuitry having an output connected to an input of the gate drive circuitry and an input connected to the power ramp controller of the wireless power transmitter.

6. The circuit as recited in claim 1, further comprising an inductor interposed between the first terminal of the coil and the first-phase-output of the inverter.

7. The circuit as recited in claim 1, wherein:
the coil, the first capacitor, and the second capacitor form a resonant circuit; and
the power ramp controller is configured to open the switch to disconnect the second capacitor to detune the resonant circuit.

8. The circuit as recited in claim 7, wherein:
the inverter comprises multiple power switching devices; and
the power ramp controller is configured to enable continuous soft switching of the multiple power switching devices of the inverter by detuning the resonant circuit.

9. The circuit as recited in claim 8, wherein the power ramp controller is configured to enable the continuous soft switching of the multiple power switching devices based on the detuning of the resonant circuit with the inverter operating at frequencies that range from 81.3 kHz to 90 kHz.

10. The circuit as recited in claim 1, wherein the switch is a first switch and the circuit further comprises:
a third capacitor having a first terminal connected to the first terminal of the first capacitor; and
a second switch having a first terminal connected to a second terminal of the third capacitor and a second terminal connected to the second terminal of the first capacitor.

11. A method for initiating transmission of power by a wireless power transmitter, the method comprising:
disconnecting, by a power ramp controller, one of at least two parallel capacitors of a resonant circuit of the wireless power transmitter;
setting a frequency of an inverter of the wireless power transmitter to a first frequency;
initiating, with the one of at least two parallel capacitors disconnected and the inverter operating at the first frequency, the transmission of the power to a wireless power receiver;
increasing an amount of the power transmitted to the wireless power receiver until a phase angle of the power in the resonant circuit reaches a predefined threshold, the phase angle based on a voltage and a current of the resonant circuit;
connecting, responsive to the phase angle reaching the predefined threshold, the one of at least two parallel capacitors of the resonant circuit of the wireless power transmitter; and
setting the frequency of the inverter to a second frequency at which the transmission of the power continues.

12. The method as recited in claim 11, further comprising:
setting the frequency of the inverter to the first frequency or a third frequency that is different from the second frequency;
disconnecting the one of at least two parallel capacitors of the resonant circuit of the wireless power transmitter; and
reducing the amount of the power transmitted to the wireless power receiver to terminate the transmission of the power to the wireless power receiver.

13. The method as recited in claim 11, wherein disconnecting the one of at least two parallel capacitors detunes the resonant circuit of the wireless power transmitter.

14. The method as recited in claim 11, wherein connecting the one of at least two parallel capacitors tunes the resonant circuit of the wireless power transmitter for optimal power transfer.

15. The method as recited in claim 11, wherein:
the first frequency to which the inverter is set is a frequency for which the resonant circuit of the wireless power transmitter is not tuned; and
the second frequency to which the inverter is set is a frequency for which the resonant circuit of the wireless power transmitter is tuned.

16. The method as recited in claim 11, wherein the predefined threshold for the phase angle of the power is at least 90 degrees.

17. The method as recited in claim 11, wherein the predefined threshold for the phase angle of the power is at least 130 degrees.

18. The method as recited in claim 11, wherein initiating the transmission of the power, with the one of at least two parallel capacitors disconnected and the inverter operating at the first frequency, is effective to maintain soft-switching of the inverter while the amount of the power transferred to the wireless power receiver is increased to a nominal level.

19. The method as recited in claim 11, wherein the first frequency or the second frequency is within a range of approximately 81.3 kHz to 90 kHz.

20. An apparatus for wireless power transmission, the apparatus comprising:
an inverter configured to provide power by operating at two or more frequencies;
a resonant circuit connected to the inverter, the resonant circuit comprising:
a coil configured to transmit power to a wireless power receiver;
a first capacitor connected in parallel with the coil;
a second capacitor connected in parallel with the coil; and
a switch interposed between a terminal of the second capacitor and a terminal of the coil; and
a power ramp controller configured to:
open the switch to disconnect the second capacitor from the coil;
set an operating frequency of the inverter to a first frequency;
initiate, with the second capacitor disconnected from the coil and the inverter operating at the first frequency, transmission of the power from the apparatus to the wireless power receiver;
increase an amount of the power transmitted until a phase angle of the power in the resonant circuit is greater than 90 degrees, the phase angle based on a voltage and a current of the resonant circuit;
set the operating frequency of the inverter to a second frequency;
close the switch to connect the second capacitor in parallel with the coil; and
transmit, with the second capacitor connected in parallel with the coil and the inverter operating at the second frequency, additional power from the apparatus to the wireless power receiver.

21. The apparatus as recited in claim 20, wherein the resonant circuit further comprises an inductor interposed between the inverter and respective terminals of the coil, the first capacitor, and the second capacitor.

22. The apparatus as recited in claim 20, wherein the switch is implemented with an isolated-gate bipolar transistor (IGBT) or a reverse-blocking IGBT (RB-IGBT).

23. The apparatus as recited in claim 22, wherein the power ramp controller is configured to control the switch via a switch control signal and the apparatus further comprises:
 isolation circuitry configured to isolate the switch control signal from the IGBT or RB-IGBT; and
 gate drive circuitry configured to drive, responsive to the switch control signal, at least one gate of the IGBT or RB-IGBT with which the switch is implemented.

24. The apparatus as recited in claim 20, wherein a capacitance of the second capacitor is approximately three percent to twelve percent of a capacitance of the first capacitor.

25. The apparatus as recited in claim 20, wherein the first frequency or the second frequency is within a range of approximately 81.3 kHz to 90 kHz.

26. The apparatus as recited in claim 20, further comprising a power supply configured to convert alternating current (AC) power of an AC power source to direct current (DC) power as input power for the inverter.

27. The apparatus as recited in claim 20, wherein the apparatus is embodied as a charging pad or a transmitter pad of a wireless electric vehicle charging (WEVC) system.

28. A circuit for continuous soft-switching in a wireless power transmitter, the circuit comprising:
 a coil having a first terminal connected to a first-phase-output of an inverter and a second terminal connected to a second-phase-output of the inverter;
 a first capacitor having a first terminal connected to the first terminal of the coil and a second terminal connected to the second terminal of the coil;
 switchable means for tuning the wireless power transmitter, the switchable means including a first terminal connected to the first terminal of the coil and a second terminal connected to the second terminal of the coil, the switchable means having a capacitance that is approximately three percent to twelve percent of a capacitance of the first capacitor; and
 control means for providing soft switching of the inverter while ramping power of the wireless power transmitter, the control means coupled to the switchable means.

29. The circuit as recited in claim 28, further comprising an inductor interposed between the first-phase-output of the inverter and respective terminals of the coil, the first capacitor, and the switchable means.

30. The circuit as recited in claim 28, wherein the switchable means comprises one or more isolated-gate bipolar transistors (IGBTs) or one or more reverse-blocking IGBT (RB-IGBTs).

* * * * *